United States Patent [19]

Williams

[11] Patent Number: 5,513,282
[45] Date of Patent: Apr. 30, 1996

[54] METHOD AND APPARATUS FOR CONTROLLING THE PROCESSING OF DIGITAL IMAGE SIGNALS

[75] Inventor: Leon C. Williams, Walworth, N.Y.

[73] Assignee: Xerox Corporation, Stamford, Conn.

[21] Appl. No.: 430,116

[22] Filed: Apr. 27, 1995

Related U.S. Application Data

[63] Continuation of Ser. No. 163,784, Dec. 9, 1993, abandoned.

[51] Int. Cl.⁶ .............................. G06K 9/54; G06K 9/34; H04N 1/40; H04N 1/387
[52] U.S. Cl. .......................... 382/303; 382/173; 382/302; 358/448; 358/453
[58] Field of Search ..................................... 382/173, 234, 382/302, 303, 304; 358/261.1, 261.3, 448, 453, 443, 530; 341/59, 67

[56] References Cited

U.S. PATENT DOCUMENTS

| | | | |
|---|---|---|---|
| 4,550,437 | 10/1985 | Kobayashi et al. | 382/41 |
| 4,574,394 | 5/1986 | Holsztyski et al. | 382/49 |
| 4,760,463 | 7/1988 | Nonoyama et al. | 358/280 |
| 4,780,709 | 10/1988 | Randall | 340/721 |
| 4,811,115 | 3/1989 | Lin et al. | 358/283 |
| 4,887,163 | 12/1989 | Maeshima | 358/443 |
| 4,897,803 | 1/1990 | Calarco et al. | 364/518 |
| 4,951,231 | 8/1990 | Dickinson et al. | 364/521 |
| 5,086,346 | 2/1992 | Fujisawa | 358/453 |
| 5,202,967 | 4/1993 | Matsuzaki et al. | 395/175 |
| 5,204,755 | 4/1993 | Taga et al. | 358/471 |
| 5,307,180 | 4/1994 | Williams et al. | 358/448 |

FOREIGN PATENT DOCUMENTS

| | | | |
|---|---|---|---|
| 0547818 | 6/1993 | European Pat. Off. | G09G 5/14 |
| 2194117 | 2/1988 | United Kingdom | H04N 1/387 |
| 2214028 | 8/1989 | United Kingdom | H04N 1/40 |

*Primary Examiner*—Jose L. Couso
*Assistant Examiner*—Matthew C. Bella
*Attorney, Agent, or Firm*—Michael J. Nickerson

[57] ABSTRACT

A method and apparatus for controlling the execution of image processing operations carried out on an array of image signals, the specific operations having been identified by a plurality of predefined windows. The windows are divided into a plurality of regions, the boundaries of which correspond to transitions from one window region to another. Each region defines an exclusive region within the array of image signals, and the image processing operations to be applied to the signals within the boundaries of that region. The image processing operations are selected by decoding an effect data word that is assigned to each pixel and which follows the pixel along the image processing path. The bits within the effect data word are not assigned individual significance which allows the effect data word, in most cases, to maintain the same bit length even though additional image processing procedures or modules have been added to the image processing path. The apparatus is designed to efficiently manage the identification of regions while minimizing the bit length of the effect data word used to identify the image processing steps. The apparatus also provides flexibility of architecture design resulting in more efficient expansion of functions and easier modifications to existing functions.

15 Claims, 8 Drawing Sheets

| INSTR WORD / FUNCTIONS | Effect Data word 1 | Effect Data word 2 | Effect Data word 3 | ... | Effect Data word N | Effect Data word N+1 |
|---|---|---|---|---|---|---|
| B/W TEXT | X | | | | | |
| COLOR TEXT | | X | X | | | |
| COLOR HT | X | X | | | | |
| B/W HT | X | X | X | | X | |
| ERROR DIFFUSION | X | X | X | | X | |
| TRC | | X | | | X | |
| MASK | X | X | | | | |
| THRESHOLD | X | X | | | | |
| FILTERING | | X | | | | |
| IP₁ | | | | | | |
| IP₂ | | | | | | |
| IP₃ • • • | | | | | | |

FIG. 7

| INSTR WORD / FUNCTIONS | Effect Data word 1 | Effect Data word 2 | Effect Data word 3 | Effect Data word 4 | ... | Effect Data word N |
|---|---|---|---|---|---|---|
| B/W TEXT | 0011 | 0100 | 0001 | 0111 | | |
| COLOR TEXT | 1010 | 1011 | 0010 | 0011 | | |
| ERROR DIFFUSION | 0000 | 0001 | 0010 | 0000 | | |
| TRC | 1001 | 1010 | 1111 | | | |
| MASK | 0001 | 1011 | | | | |
| THRESHOLD | 1000 | | | | | |
| FILTERING | 0001 | 1010 | 0111 | | | |
| ... | | | | | | |
| FUNCTION M | 0010 | 0001 | | | | |

METHOD AND APPARATUS FOR CONTROLLING THE PROCESSING OF DIGITAL IMAGE SIGNALS

This is a continuation of application Ser. No. 08/163,784, filed Dec. 9, 1993, now abandoned.

This invention relates generally to a digital signal processing apparatus, and more particularly, to the control of digital image processing operations which may be applied to an array of digital signals that are representative of an image.

BACKGROUND OF THE INVENTION

The features of the present invention may be used in the printing arts, and more particularly, in digital image processing and electrophotographic printing. In digital image processing, it is commonly known that various image processing operations may be applied to specific areas, windows, or pixels of an image. It is also known that the image processing operations to be applied to individual pixels of the image may be controlled or managed by a pixel location comparison scheme. In other words, comparing the coordinate location of each pixel with a series of window coordinate boundaries to determine within which window a pixel lies. Once the window is determined, the appropriate processing operation can be defined for the digital signal at that pixel location.

Previously, various approaches have been devised for the control of digital image processing and window management. These approaches will be discussed in more detail below.

U.S. Pat. No. 4,760,463 to Nonoyama et al. discloses an image scanner including an area designating section for designating a rectangular area on an original and a scanning mode designating section for designating an image scanning mode within and outside the rectangular area designated by the area designating section. Rectangular areas are defined by designating the coordinates of an upper left corner and a lower right corner. Subsequently, counters are used for each area boundary, to determine when the pixel being processed is within a specific area.

U.S. Pat. No. 4,780,709 to Randall discloses a display processor, suitable for the display of multiple windows, in which a screen may be divided into a plurality of horizontal strips which may be a single pixel in height. Each horizontal strip is divided into one or more rectangular tiles. The tiles and strips are combined to form the viewing windows. Since the tiles may be a single pixel in width, the viewing window may be arbitrarily shaped. The individual strips are defined by a linked list of descriptors in memory, and the descriptors are updated only when the the viewing windows on the display are changed. During generation of the display, the display processor reads the descriptors and fetches and displays the data in each tile without the need to store it intermediately in bit map form.

U.S. Pat. No. 4,887,163 to Maeshima discloses an image processing apparatus having a digitizing unit capable of designating desired areas in an original image and effecting the desired image editing process inside and outside the designated areas A desired rectangular area is defined by designating two points on the diagonal corners of the desired rectangular area. During scanning, a pair of editing memories are used interchangeably to enable, first, the editing of thresholded video data from a CCD, and secondly, the writing of editing information for use with subsequent video data. The editing memories comprise a memory location, one byte, for each CCD element, the location holding image editing data which determines the editing process to be applied to the signal generated by the respective CCD element.

U.S. Pat. No. 4,897,803 to Calarco et al., the entire teachings of which are hereby incorporated by reference, discloses a method and apparatus for processing image data having a token associated with each data element, thereby identifying the element's location in an image. During processing of the image data, the token for each data element is passed through address detection logic to determine if the token identifies the application of an image processing operation.

U.S. Pat. No. 4,951,231 to Dickinson et al. discloses an image display system in which image data is stored as a series of raster scan signals in a data processor system. The position and size of selected portions of an image to be displayed on a display screen can be transformed in response to input signals received from a controlled input device. The display device includes a control program memory which stores control programs for a plurality of transform operations, such as rotation, scaling, or extraction.

U.S. patent application, Ser. No. 07/809,807, to Williams et al. discloses a system which improves upon the above-described systems by reducing the amount of non-data information needed to identify the image processing operation that is to be applied to each data element. An apparatus manages the processing of an array of digital signals representing an original image in order to produce an array of modified digital signals. The image processing apparatus is able to operate on non-overlapping rectangular regions or tiles defined with respect to the input signal array, and to thereby identify image processing effects to be applied to the signals lying within the tiles. In response to the identified image processing effects defined for each signal, image processing hardware within the system is selectively enabled to process the signals. The apparatus uses an effect pointer for each of a plurality of non-overlapping tile regions within the image data to selectively enable the image processing operations associated with those effects for signals within the regions.

A brief description of this conventional system will be given below with respect to FIGS. 1–4. The entire contents of U.S. patent application, Ser. No. 07/809,807, are hereby incorporated by reference.

FIG. 1 schematically depicts the various components of a digital image processing hardware module that might be used in an electroreprographic system for the processing and alteration of video signals prior to output on a xerographic printing device. Image processing module 20 generally receives offset and gain corrected video signals on input lines 22. The video input data may be derived from a number of sources, including a raster input scanner, a graphics workstation, or electronic memory or similar storage elements. Subsequently, module 20 processes the input video data according to control signals from microprocessor 24 to produce the output video signals on line 26. As illustrated, module 20 may include an optional segmentation block 30 which has an associated line buffer or line buffers, two-dimensional filter 34, and an optional one-dimensional effects block 36. Also included in module 20 is scanline buffer memory 38 comprising a plurality of individual scanline buffers for storing the context of incoming scanlines.

Segmentation block 30, in conjunction with its associated scanline buffer, parses the incoming video data to automatically determine those areas of the image which are representative of a halftone input region. Output from the segmentation block (Video Class) is used to implement subsequent image processing effects in accordance with the type or class of video signals identified by the segmentation block. Otherwise, a remaining portion of the input video image may be processed with either an edge enhancement filter to improve fine line and character reproduction when thresholded. It is noted that the segmentation block 30 may also parse the video data into other classes like continuous tone regions, color text regions, error diffusion regions, etc.

A two-dimensional (2D) filter block 34 processes the incoming corrected video in accordance with a set of predefined image processing operations, as controlled by a window effects selection and video classification. As illustrated by line buffer memory 38, a plurality of incoming video data may be used to establish the context upon which the two-dimensional filter(s) and subsequent image processing hardware elements are to operate.

Subsequent to two-dimensional filtering, the optional one-dimensional (1D) effects block is used to alter the filtered or unfiltered video data in accordance with a selected set of one-dimensional or two-dimensional video effects. As in the two-dimensional filter, the one-dimensional effects block also includes a bypass channel, where no additional effects would be applied to the video, thereby enabling the 8-bit filtered video to be passed through as output video. It is also noted that two-dimensional effect blocks may be used in conjunction with the one-dimensional effect block.

Selection of the various combinations of "effects" and filter treatments to be applied to the video stream is performed by microprocessor 24. Through the establishment of window tiles, independent regions of the incoming video stream, portions selectable on a pixel by pixel basis, are processed in accordance with predefined image processing parameters or effects. The activation of the specific effects is accomplished by selectively programming the features prior to or during the processing of the video stream. The data for each pixel of image information, as generated by the tiling apparatus and video classification, has an associated single bit or field identifier to control the image processing operations performed thereon.

Referring now to FIG. 2, which depicts an example array of image signals 50 having overlapping windows 52 and 54; the windows are used to designate different image processing operations which are effects to be applied to the image signals in the array. In general, windows 52 and 54 serve to divide the array into four distinct regions, A–D. Region A includes all image signals outside of the window regions. Region B encompasses those image signals which fall within window 52 and outside of window 54. Similarly, region D includes all image signals within window 54 lying outside of window 52, while, region C includes only those image signals which lie within the boundaries of both windows 52 and 54, the region generally referred to as the area of "overlap" between the windows.

In FIG. 3, image array 50 of FIG. 2 has been further divided into a plurality of independent, non-overlapping tiles, the tiles are generally defined by transitions from the different regions identified in FIG. 2. For instance, tile 1 is the region extending completely along the top of array 50. Tile 2 is a portion of the region that is present between the left edge of the image array and the left edge of window 52. Continuing in this fashion, region A of FIG. 2 is determined to be comprised of tiles 1, 2, 4, 5, 9, 10, 12, and 13. Similarly, region B is comprised of tiles 3 and 6.

The resolution of the tile boundaries is a single pixel in the fast-scan direction, and a single scanline in the slow-scan direction. The high resolution of the boundaries enables the processing of windows or regions having complex shapes. The image processing operations specified for each of the tiles which comprise a window or region are controlled by a window control block present within the two-dimensional block 34 of FIG. 1. It is noted that the window control block may be separate from the the two-dimensional block 34.

With respect to FIG. 4, window control block 80 is used to control operation of two-dimensional filter control block 82, as well as to send a window effects signal to the subsequent one-dimensional block, block 36 of FIG. 1, via output line 84. In operation, the two-dimensional filter, consisting of blocks 88a, 88b, 90, 92, and 94, receives image signals (SL0–SL4) from scanline buffer 38 and processes the signals in accordance with control signals generated by filter control block 82. More specifically, slow scan filter blocks 88a and 88b continuously produce the slow-scan filtered output context, which is selected by MUX 90 on a pixel-by-pixel basis for subsequent processing at fast-scan filter 92. Fast-scan filter 92 then processes the slow-scan context to produce a two-dimensional filtered output which is passed to MUX 94. MUX 94, controlled by filter control block 82, is the "switch" which selects between the filtered output(s) and the filter bypass, in accordance with the selector signal from filter control 82, thereby determining which video signals are to be placed on VIDEO OUT line 96. Two-dimensional convolution can also be used as a filtering technique as discussed in U.S. patent application Ser. No. 07/809,897 to Clingerman et al. The entire contents of this patent application (Ser. No. 07/809,897) are hereby incorporated by reference.

The bit positions for the window effects are significant in the conventional system. For example, a first bit position D0 may determine whether the dynamic range adjustment will be carried out on all image signals lying within a tile. Similarly, a second bit position D1 may control the application of a tonal-reproduction-curve (TRC) adjustment operation. Third and fourth bit positions D2 and D3 may be determinative of the masking operation to be employed on the video signal. A fifth bit position D4 may control the application of a moire reduction process to the video signals to eliminate aliasing caused by scanning of an original document with periodic structures (e.g., halftone patterns). Thus, in this conventional system, the controlling of the image processing operations is strictly dependent on the binary (logic) value residing in a single bit or field.

Although Williams et al. (Ser. No. 07/809,807) discloses a system which reduces the memory requirements, the system can add to the complexity of the system's architecture which hinders expansion and modifications. More specifically, by utilizing single bits of fields within the data word to designate a specific image processing operation, the data word must be expanded each time a new image process is added to the system, or the data word must be reformatted each time an image process is replaced with another image process. This control configuration reduces the ability of the system's architecture to be easily adaptable to change to the image processing scheme.

As discussed above with respect to conventional systems, single effect bits or effect fields, attached to each pixel, are used to control which image processing operators were to be applied. In contrast, the present invention uses an entire effect data word which is attached to each pixel. The use of a data word enables the reduction in the numbers of bits used for control purposes which results in a lower cost and hardware pin count, the establishment of a common interface between all image processing modules, and the capability to easily expand as future imaging operators are added.

OBJECTS AND SUMMARY OF THE PRESENT INVENTION

Therefore, one object of the present invention is to provide a control configuration and method which enables a system to be easily adaptable to changes without significantly changing the system's architecture.

One aspect of the present invention is a system for processing video input signals of an image to produce modified video signals. This system identifies each video signal in one region of a plurality of regions, by tiles or segmentation, within the image and generates an effect data word for each segment of the image. The effect data word designates which image processing operations are to be applied to the image segments within the region. The effect data word has at least two bits wherein the bits, as a group, represent a set of image processing operations. A decoder decodes the effect data word to determine if a specific image process operation is to be executed and generates a control signal enabling the execution of the specific image process operation. Lastly, an image processing module, responsive to the control signal, processes the segment of the video input signal when the image processing operation is enabled by the control signal to produce the modified video signals.

Another aspect of the present invention is a system for sequentially processing an orthogonal array of digital image signals to produce an array of modified digital image signals. This system distinguishes, within the array of image signals, a plurality of discrete regions. An effect generator indicates an image processing operation to be applied to a selected digital image signal, with the image processing operation being dependent upon the location of the selected digital image signal with respect to the regions. The effect generator also generates an effect data word representing a set of image processing operations to be applied to a selected digital image signal. The effect data word has at least two bits wherein the bits, as a group, represent an image processing operation. A decoder decodes the effect data word to determine if a specific image process operation is to be executed and generates a control signal enabling the execution of the specific image process operation. Lastly, an image processing module, responsive to the control signal, processes the segment of the video input signal when the image processing operation is enabled by the control signal to produce modified video signals.

A third aspect of the present invention is a method for selectively controlling the application of at least one image processing effect to a plurality of digital signals representing an image. This method partitions the image into a plurality of regions, characterizes the regions, and stores the characteristics of the regions in a memory. The method then initializes data elements based upon the characteristics stored in the memory and consecutively selects an unprocessed signal from the plurality of digital image signals. The region within which the selected signal lies is identified and an image processing operation or operations to be applied to the selected signal is determined based upon the identification of the region. An effect data word representing a set of image processing operations to be applied to the selected signal is generated. This effect data word has at least two bits wherein the bits, as a group, represent the image processing operation. The effect data word is decoded to determine if a specific image process operation is to be executed.

Further objects and advantages of the present invention will become apparent from the following description and the various features of the present invention.

BRIEF DESCRIPTION OF THE DRAWINGS

The following is a brief description of each drawing used to describe the present invention, and thus, are being presented for illustrative purposes only and should not be limited of the scope of the present invention, wherein:

FIG. 7 illustrates a table showing the control concepts of the present invention;

DESCRIPTION OF THE PREFERRED EMBODIMENT

Figure 1:
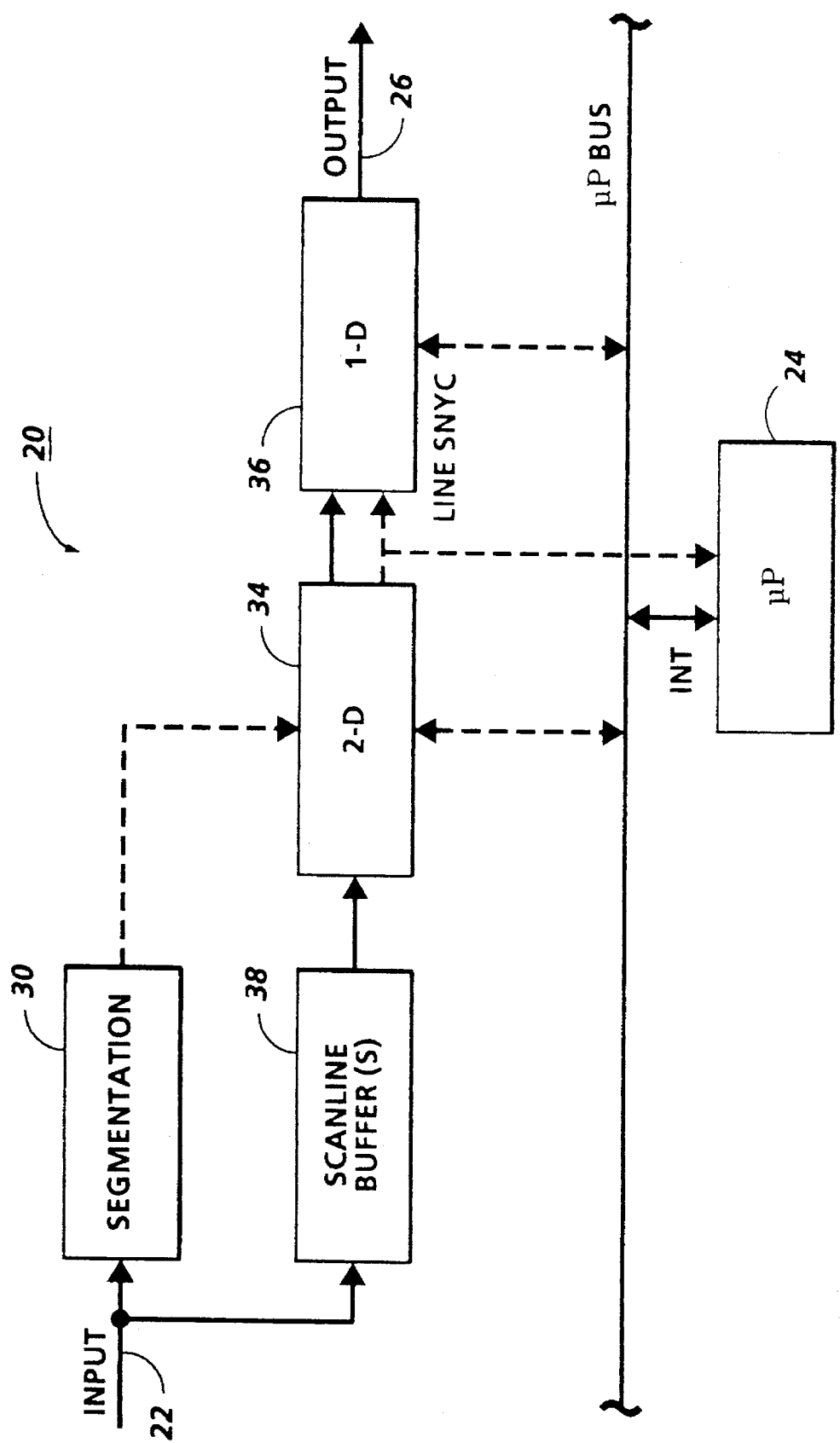
FIG. 1 illustrates a block diagram showing the architecture of a conventional system.
Figure 2:
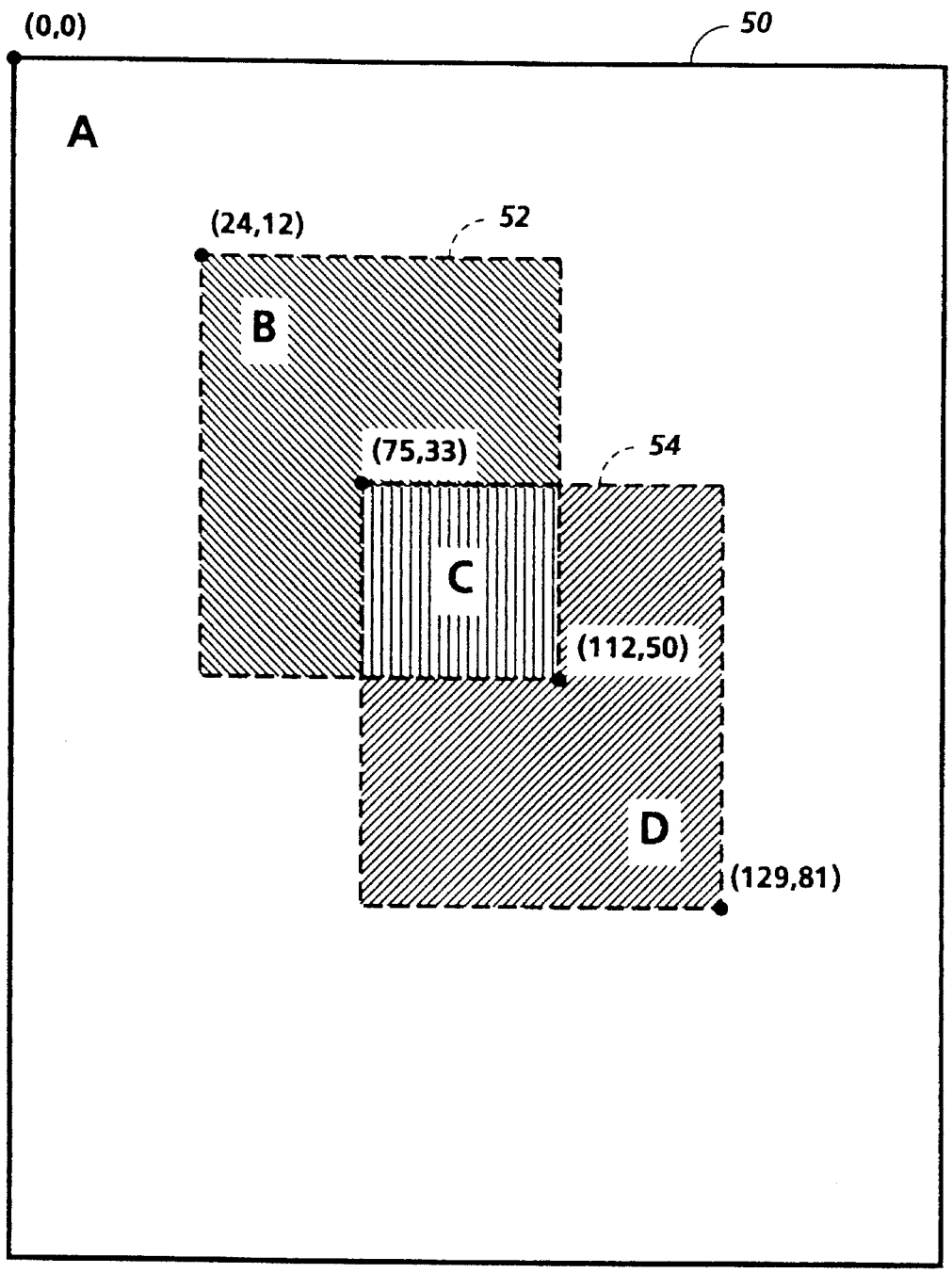
FIG. 2 illustrates an example of an array of image signals which depicts the use of a pair of windows defined within the array.
Figure 3:
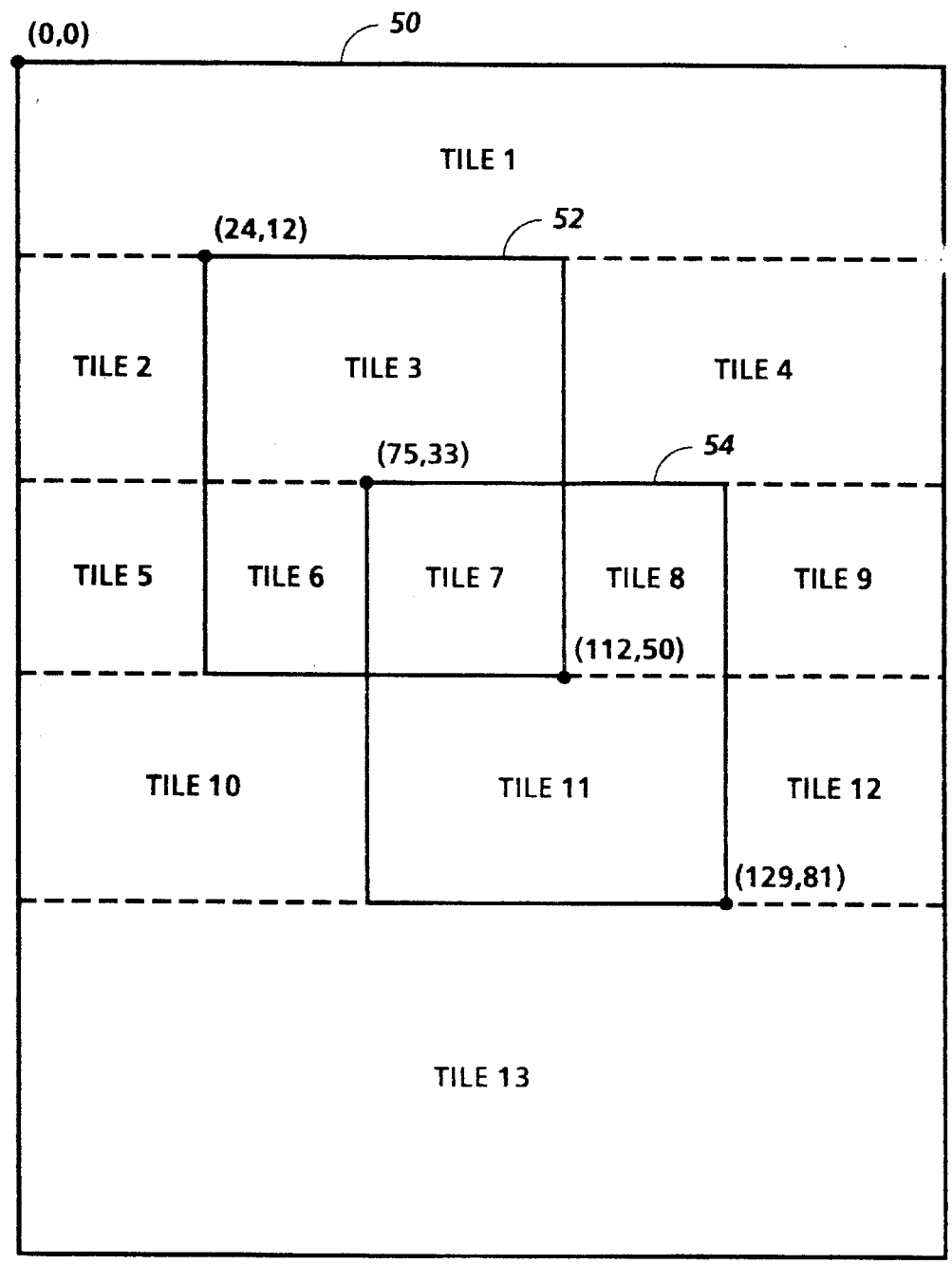
FIG. 3 illustrates the division of the image array of FIG. 2.
Figure 4:
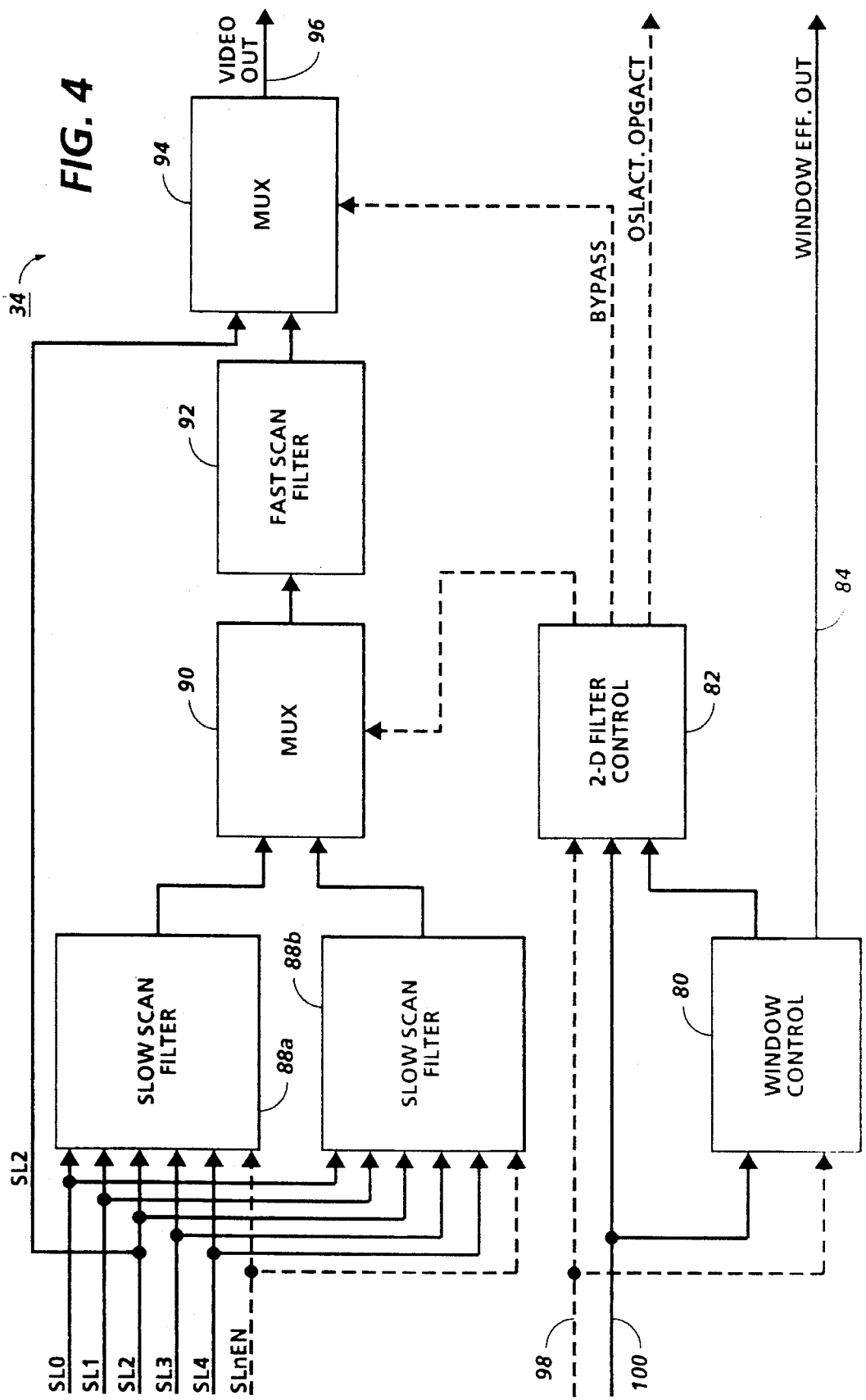
FIG. 4 illustrates a detailed block diagram showing the two-dimensional (2D) block of FIG. 1.

The following description includes references to slow-scan and fast-scan directions when referring to the orientation, or directionality, within orthogonal arrays of digital image signals. For purposes of clarification, fast-scan data is intended to refer to individual pixel signals located in succession along a single raster of image information, while slow-scan data would refer to data derived from a common raster position across multiple rasters or scanlines. As an example, slow-scan data would be used to describe signals captured from a plurality of elements along a linear photosensitive array as the array moves relative to the document. On the other hand, fast-scan data would refer to the sequential signals collected along the length of the linear photosensitive array during a single exposure period, and is also commonly referred to as a raster of data. More importantly, these references are not intended to limit the present invention solely to the processing signals obtained from an array of stored image signals, rather the present invention is applicable to a wide range of video input devices which generally produce video output as a sequential stream of video signals.

For a general understanding of the image processing architecture incorporating the features of the present invention, reference is made to the drawings. In the drawings, like reference numerals have been used throughout to designate identical elements.

In order to implement a flexible and expandable image processing architecture, it is necessary to define an interface between each module so that the new features may be added at a later time. As discussed above, conventionally, interfaces were uniquely defined for each module. As such, a segmentor would analyze the video signal and apply a classification to each pixel. This classification, along with the video signal, would be passed to a window generation module. The window generation module would determine what effects were programmed for each pixel and attach thereto the selected effects.

Conventionally, if segmentation was enabled for that pixel, the effects program for the determined classification were applied in place of the determined effects from the window region. At this point, each pixel was paired with a matching effect which contained a bit for each of the remaining modules in the video processing path; i.e., filter, tonal-reproduction-curve, screen/threshold, invert, etc. As each module used its associated effect bit, the video signal would be modified and the effect bit would be discarded until only the process video remained.

This approach limits the extensibility of the architecture since no new modules can be added without redesigning the existing hardware to compensate for the additional effect bits for the new functions. Also, as the number of effects and their associated bits continue to increase, the number of bits grows. For example, to implement a selection of 16 different tonal-reproduction-curves and 8 different screens, the number of effects bits, in a conventional device, would be 18. A data word having a bit length of 18 enables 262,144 different effect combinations which is not required in existing image processors.

In contrast, the present invention utilizes an effect data word. Using this strategy, all image processing modules receive an effect data word for each video pixel the module processes. Based on this effect data word, the module uses the effect data word to index a programmable table to determine what operation, if any, must be performed upon that pixel. In addition, the effect data word is passed along with the processed video. However, if a segmentor or other such function is used, the effect data word can be modified during the image processing operations. The actual hardware which implements the basic concepts of the present invention will be discussed in more detail below.

Figure 5:
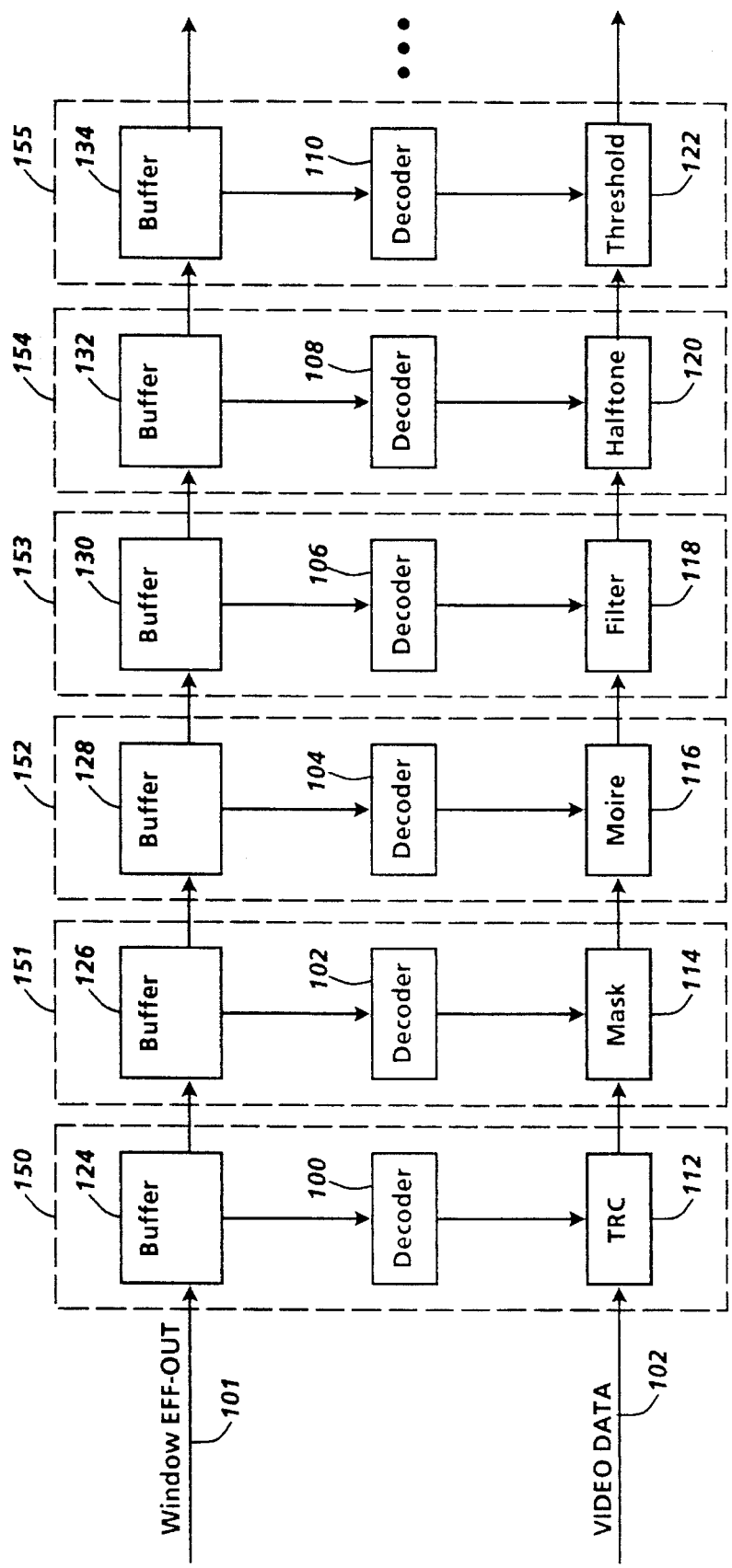
FIG. 5 illustrates the architecture for the control of the image processing for one embodiment of the present invention.

FIG. 5 illustrates a system's architecture using the effect data word tagging of the present invention. In this embodiment, the effect data word is received on busline 101 and is fed into a first buffer 124 of image processing module 150. Buffer 124 is connected to buffer 126 of image processing module 151 which in turn is connected to buffer 128 of image processing module 152. Moreover, buffer 128 is connected to buffer 130 of image processing module 153 which is connected to buffer 132 of image processing module 154 and which is connected to buffer 134 of image processing module 155. In other words, buffers 124, 126, 128, 130, 132, and 134 (image processing modules 150, 151, 152, 153, 154, and 155) are connected in series to enable the proper propagation of the effect data word and video signal through the image processing area. The buffers are utilized to ensure that the correct effect data word is in parallel with its associated pixel of video data.

In this architectural configuration, each buffer is connected to an associated decoder. More specifically, in FIG. 5, buffers 124, 126, 128, 130, 132, and 134 are connected to decoders 100, 102, 104, 106, 108, and 110, respectively. The decoders decode the input of the effect data word from the associated buffer to determine which specific functions the associated image processing operator (circuit) should perform upon the pixel data received from the video data line 102 and which is residing within that individual image processing module.

For example, in FIG. 5, decoder 100 may decode the effect data word to indicate that the tonal-reproduction-curve image processing circuit 112 of tonal-reproduction-curve image processing module 150 should not be enabled with respect to the particular pixel data residing within the module. Thus, the tonal-reproduction-curve image processing module 150 would merely allow the pixel data to pass therethrough to the next image processing module. On the other hand, decoder 100 may decode the effect data word to indicate that a certain tonal-reproduction-curve table within the image processing module should be used when operating upon the pixel data therein.

The image processing module, for example image processing module 150 of FIG. 5, receives an offset and gain corrected video signal on input line 102. The video input data can be derived from a number of sources, including a raster input scanner, a graphics workstation, or electronic memory or similar storage elements. Moreover, the video input data in the present embodiment comprises 8-bit gray data, passed in a parallel fashion along the input data bus. Subsequently, module 150 processes the input video data according to control signals from the decoder 100 to produce the outputted video signal.

The various image processing module operators shown in FIG. 5 are for illustration purposes only. In other words, the overall system's architecture should not be limited to only the illustrated functions but any image processing operation required to properly process pixel data. Moreover, the order of the image processing modules is merely illustrative, and thus, the exact order of the image processing module should be arranged such that the image processing of the pixels are optimal.

Upon completion of the operations in the first image processing module, the processed or unprocessed pixel data is passed to the next image processing module with the effect data word where the above-described process, with respect to the decoder, is repeated. The pixel data and the effect data word propagate in parallel through the various image processing modules until the pixel data exits the image processing area and is ready for the printing process.

Figure 6:
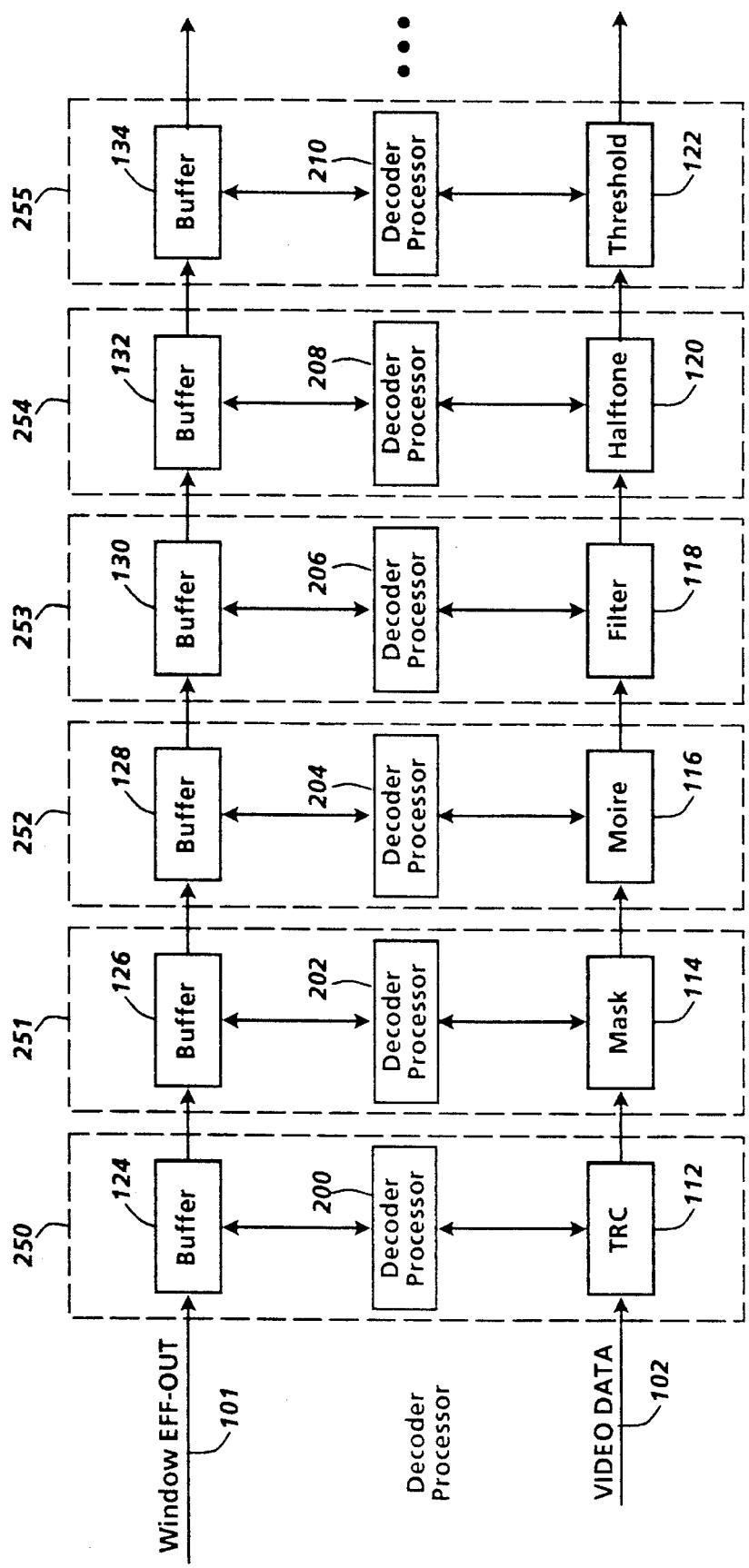
FIG. 6 illustrates the control architecture for another embodiment of the present invention.

FIG. 6 illustrates another embodiment of the system's architecture using the effect data word tagging of the present invention. In this embodiment, the effect data word can be manipulated by the individual image processing modules. As in FIG. 5, the effect data word is received on busline 101 and is fed into a first buffer 124 of image processing module 250. Buffer 124 is connected to buffer 126 of image processing module 251 which in turn is connected to buffer 128 of image processing module 252. Moreover, buffer 128 is connected to buffer 130 of image processing module 253 which is connected to buffer 132 of image processing module 254 and which is connected to buffer 134 of image processing module 255. In other words, buffers 124, 126, 128, 130, 132, and 134 (image processing modules 250, 251, 252, 253, 254, and 255) are connected in series to enable the proper propagation of the effect data word and video signal through the image processing area. The buffers are utilized to ensure that the correct effect data word is in parallel with its associated pixel of video data.

In this architectural configuration, each buffer is connected to an associated decoder/processor. More specifically, in FIG. 6, buffers 124, 126, 128, 130, 132, and 134 are connected to decoders/processors 200, 202, 204, 206, 208, and 210, respectively. The decoders decode, as in FIG. 5, the inputted effect data word from the associated buffer to determine which specific functions the associated image processing operator (circuit) should perform upon the pixel residing within that individual image processing module. However, these decoders also include a processor which in response to the associated image processing circuit can change the effect data word so as to affect the image processing routines located downstream. For example, the tonal-reproduction-curve image processing circuit may process the video data such that a masking process is unnecessary eventhough the original effect data word had called for such a masking routine. The image processing circuit would merely instruct the decoder/processor to change the effect data word so as to eliminate the need for masking.

Also, as in FIG. 5, decoder 100 of FIG. 6 may decode the effect data word to indicate that the tonal-reproduction-curve image processing circuit 112 of tonal-reproduction-curve image processing module 250 should not be enabled with respect to the particular pixel data residing within the module. Thus, the tonal-reproduction-curve image processing module 250 would merely allow the pixel data to pass through to the next image processing module.

The image processing module, for example image processing module 250, receives an offset and gain corrected video signal on input line 102. The video input data can be derived from a number of sources, including a raster input scanner, a graphics workstation, or electronic memory or similar storage elements. Moreover, the video input data in the present embodiment comprises 8-bit gray data, passed in a parallel fashion along the input data bus. Subsequently, module 250 processes the input video data according to control signals from the decoder/processor 200 to produce the outputted video signal.

Upon completion of the operations in the first image processing module, the processed or unprocessed pixel data is passed to the next image processing module with the effect data word remaining unchanged or changed. In the next image processing module, the above-described process, with respect to the decoder/processor, is repeated. The pixel data and the effect data word propagate in parallel through the various image processing modules until the pixel data exits the image processing area and is ready for the printing process.

The various image processing module operators shown in FIG. 6 are for illustration purposes only. In other words, the overall system's architecture should not be limited to only the illustrated functions but any image processing operation required to properly process pixel data. Moreover, the order of the image processing modules is merely illustrative, and thus, the exact order of the image processing module should be arranged such that the image processing of the pixels are optimal.

FIG. 7 is a table illustrating the effect data word tagging of the present invention. In FIG. 7, the vertical columns represent individual effect data words or operands. In the horizontal rows, the functions represent specific image processing operations which can be performed upon pixel data. As shown in this table, a single operand or effect data word can represent a plurality of image processing operations.

For example, as illustrated in FIG. 7, operand 1 may represent the functions of black and white text processing, black and white halftone processing, error diffusion, masking, threshold processing, and filtering. On the other hand, operand 3 may represent the image processing functions of color text processing, error diffusion, and tonal-reproduction-curve image processing. Consistent with the basic concepts of the present invention, it is noted that the entire effect data word is responsible for defining the various image processing operations to be formed upon the pixel data, not single isolated data bits or fields. This concept is more clearly illustrated in the table shown in FIG. 8.

Figures 8, 9:
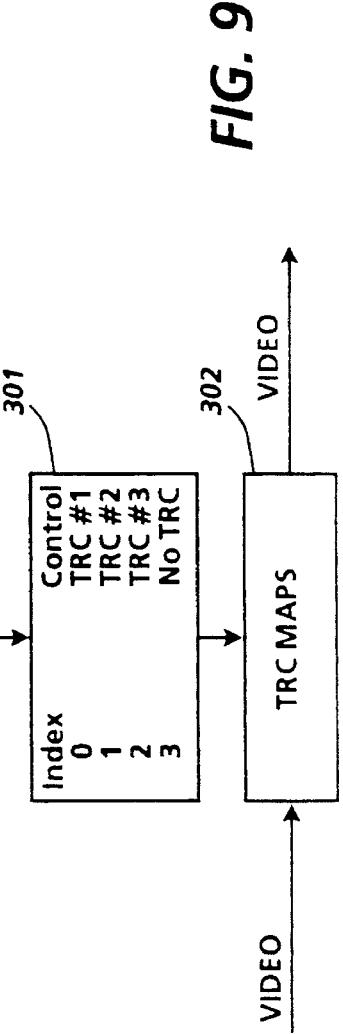
FIG. 8 illustrates another table showing the control concepts of the present invention.
FIG. 9 illustrates a tonal reproduction curve image processing module utilizing the effect tagging system of the present invention.

FIG. 8 is a table illustrating examples of the possible effect data words which when decoded would cause the various image processing modules to function accordingly. More specifically, as illustrated in FIG. 8, the effect data words 0011, 0100, 0001, and 0111, for example, would cause the black and white text image processing module to operate upon the pixel data residing therein. In other words, if the decoder associated with the black and white text image processing module received one of the four exemplary effect data words, the black and white text image processing module would be enabled, and the pixel data residing therein would be processed accordingly.

Again, consistent with the basic concepts of the present invention, it is noted that the effect data word 0001, in this example, would also enable the functions of filtering, masking, error diffusion, and black and white text image processing. In other words, no single bit or field within the effect data word governs the enablement of the various image processing modules, but it is the decoding of the entire effect data word which provides the enablement of specific image processing modules within the image processing system.

The effect data words illustrated in FIGS. 7 and 8 are generated in a window effect data word generator (not shown). This generator is similar to the conventional generator discussed above except that the generator of the present invention includes a look-up table from which the effect data words are produced. As the window generator analyzes the pixel data, various signals are produced indicating the image processing operations that are to be performed upon the pixel data. These signals are used to address the look-up table which in turn outputs the proper effect data word that encompasses all the image processing operations to be performed. Thus, unlike the conventional systems, the individual signals of the present invention themselves do not control the image processing modules, but are used to generate an effect data word to be decoded by the various image processing modules.

An example of the utilization of an effect data word, according to the present invention is illustrated in FIG. 9. In FIG. 9, a tonal-reproduction-curve module is shown as an example of an image processing module utilizing the effect data word of the present invention. Upon entering the module, the effect data word is inputted into a table which has been preprogrammed with various tonal-reproduction-curve maps to be used for each possible effect data word value. The effect data word is utilized as an index for this table to determine which tonal-reproduction-curve map is to be used with the particular pixel residing in the tonal-reproduction-curve image processing module. The effect data word is then outputted from the module along with the process video.

It is noted that a segmentation block can be utilized prior to the image processing area. The segmentation block (not shown), in conjunction with its associated scanline buffer, which provides at least one scanline line of storage, is intended to parse the incoming video data to automatically determine those areas of the image which are representative of a halftone input region. Output from the segmentation block is used to implement subsequent image processing effects in accordance with the type or class of video signals identified by the segmentation block.

For example, the segmentation block may identify a region containing data representative of an input halftone image, in which case a low pass filter would be used to remove screen patterns. Otherwise, a remaining text portion of the input video image may be processed with an edge enhancement filter to improve fine line and character reproduction when thresholded. In other words, the segmentation block can be used in conjunction with the effect data word generator to generate the proper effect data word for individual pixel. Additional details of the operation of a segmentation block may be found in the pending U.S. patent application for "Improved Automatic Image Segmentation-"(Ser. No. 07/722,568) by Shiau et al., the teachings of which are hereby incorporated by reference.

Two-dimensional (2D) filtering can also be incorporated into the architecture of the present invention. A two-dimensional (2D) filter (not shown) processes the incoming video in accordance with a set of predefined image processing operations, as controlled by the effect data word. A plurality of incoming video data can be used to establish the context upon which the two-dimensional filter and subsequent image processing hardware elements are to operate. To avoid deleterious affects to the video stream caused by filtering of the input video, prior to establishing the proper filter context, the input video may bypass the filter operation on a bypass channel within the two-dimensional filter hardware. Actual details of the two-dimensional filtering treatments are included in copending U.S. patent application "Method and Apparatus for Implementing Two-Dimensional Digital Filters", (Ser. No. 07/809,897) by Clingerman et al. This pending U.S. patent application (Ser. No. 07/809,897) is hereby incorporated by reference.

Subsequent to two-dimensional filtering, the various one-dimensional (1D) or two-dimensional (2D) effect blocks are used to alter the filtered, or possibly unfiltered, video data in accordance with the effect data word. One-dimensional video effects include, for example, thresholding, screening, inversion, tonal-reproduction-curve adjustment, pixel masking, one-dimensional scaling, and other effects which may be applied to the stream of video signals. As in the two-dimensional filter, the one-dimensional effect blocks also include a bypass channel, where no additional effects would be applied to the video, thereby enabling the 8-bit filtered video to be passed through as output video.

By utilizing of an effect data word, all the image processing modules can have the same interface regardless of functionability. Also, new modules can be added into the video stream without requiring redesign of previous modules, while the number of bits required for the effect data word stays substantially fixed and does not necessarily grow with the number of modules added thus reducing pin count when implemented. Lastly, the effect data word is passed completely through the system rather than being discarded as used.

The present invention also keeps track of the attributes associated with each image segment in such a way that the information can be used by any process in the system. This is realized by utilizing the effect data words to tag each image segment wherein the effect data word represents the attributes of the image segment. This attribute tagging permits new image processing operations to be added anywhere in the data stream without requiring redesigning of the systems architecture. Moreover, the attribute tagging system can be utilized in any system which desires to tag image segments. More specifically, the present attribute tagging system can be utilized in image filing, printing, and electronic subsystems.

Although the present invention has been described in detail above, various modifications can be implemented without imparting from the spirit. For example, the look-up table utilized by the window effect data word generator may be a logic circuit which would produce the desired effect data word. Also, although the present invention has been described with respect to specific hardware, the concepts of the present invention can also be readily implemented in software.

While the invention has been described with reference to various embodiment disclosed above, it is not confined to the details set forth above, but is intended to cover such modifications or changes as may come within the scope of the attached claims.

I claim:

1. An apparatus for processing a video signal representing an image to produce a modified video signal, comprising:

a video signal source for providing a video signal;

instruction means, operatively connected to said video source, for generating an effect dataword for the video signal, the effect dataword designating a set of image processing operations to be applied to the video signal, the effect dataword having at least two bits, representing the set of image processing operations;

first buffer means, operatively connected to said instruction means, for buffering the effect dataword;

first decoding means, operatively connected to said first buffer means, for decoding the entire effect dataword buffered in said first buffer means to determine if a first specific image process operation is to be executed upon the video signal and for generating a first control signal enabling execution of said first specific image process operation upon the video signal;

first image processing means, responsive to said first control signal, for processing the video signal, when said first specific image processing operation is enabled by said first control signal, to produce a modified video signal;

second buffer means, operatively connected to said first buffer means, for receiving an effect dataword from said first buffer means and for buffering the received effect dataword;

second decoding means, operatively connected to said second buffer means, for decoding the entire effect dataword buffered in said second buffer means to determine if a second specific image process operation is to be executed upon the video signal received from said first image processing means and for generating a second control signal enabling execution of said second specific image process operation upon the video signal; and second image processing means, operatively connected to said first image processing means and responsive to said second control signal, for processing the video signal received from said first image processing means, when said second specific image processing operation is enabled by said second control signal, to produce a modified video signal.

2. The apparatus as claimed in claim 1, further comprising:

third buffer means, operatively connected to said second buffer means, for receiving an effect dataword from said second buffer means and for buffering the received effect dataword;

third decoding means, operatively connected to said third buffer means, for decoding the entire effect dataword buffered in said third buffer means to determine if a third specific image process operation is to be executed upon the video signal received from said second image processing means and for generating a third control signal enabling the execution of said third specific image process operation; and third image processing means, operatively connected to said second image processing means and responsive to said third control signal, for processing the video signal received from said second image processing means, when said third specific image processing operation is enabled by said third control signal, to produce a modified video signal.

3. The apparatus as claimed in claim 1, wherein said first image processing means comprises a masking module.

4. The apparatus as claimed in claim 1, wherein said first image processing means comprises a thresholding module.

5. The apparatus as claimed in claim 1, wherein said first image processing means comprises a tonal-reproduction-curve module.

6. The apparatus as claimed in claim 1, wherein said first image processing means comprises a filtering module.

7. An apparatus for sequentially processing an array of digital image signals to produce an array of modified digital image signals, comprising:

instruction means for receiving the array of digital image signals, for indicating an image processing effect to be applied to a selected digital image signal and for generating an effect dataword representing the image processing effect to be applied to the selected digital image signal, the effect dataword having at least two bits, the bits, as a group, representing a set of image processing operations;

first buffer means, operatively connected to said instruction means, for buffering the effect dataword;

first decoding means, operatively connected to said first buffer means, for decoding the entire effect dataword buffered in said first buffer means to determine if a first specific image process operation is to be executed upon the selected digital image signal and for generating a first control signal enabling the execution of the first specific image process operation;

first image processing means, responsive to said first control signal, for processing the selected digital image signal when the image processing operation is enabled by the control signal to produce a modified digital image signal;

second buffer means, operatively connected to said first buffer means, for receiving an effect dataword from said first buffer means and for buffering the received effect dataword;

second decoding means, operatively connected to said second buffer means, for decoding the entire effect dataword buffered in said second buffer means to determine if a second specific image process operation is to be executed upon the selected digital image signal received from said first image processing means and for generating a second control signal enabling execution of the second specific image process operation upon the selected digital image signal received from said first image processing means; and second image processing means, responsive to said second control signal, for processing the selected digital image signal received from said first image processing means when the second specific image processing operation is enabled by said second control signal to produce a modified digital image signal.

8. The apparatus as claimed in claim 7, wherein the discrete regions comprise non-overlapping tiles having a rectangular shape.

9. The apparatus as claimed in claim 7, further comprising:

third buffer means, operatively connected to said second buffer means, for receiving an effect dataword from said second buffer means and for buffering the received effect dataword;

third decoding means, operatively connected to said third buffer means, for decoding the entire effect dataword buffered in said third buffer means to determine if a third specific image process operation is to be executed upon the selected digital image signal received from said second image processing means and for generating a third control signal enabling the execution of said third specific image process operation; and third image processing means, responsive to said third control signal, for processing the selected digital image signal received from said second image processing means when said third specific image processing operation is enabled by said third control signal to produce a modified digital image signal.

10. The apparatus as claimed in claim 7, wherein said first image processing means comprises a masking module.

11. The apparatus as claimed in claim 7, wherein said first image processing means comprises a thresholding module.

12. The apparatus as claimed in claim 7, wherein said first image processing means comprises a tonal reproduction curve module.

13. The apparatus as claimed in claim 7, wherein said first image processing means comprises a filtering module.

14. A method for selectively controlling the application of at least one image processing effect to a plurality of image signals representing an image, comprising the steps of:

(a) determining which image processing operations are to be applied to a selected image signal (b) generating an effect dataword representing a set of image processing operations to be applied to the selected image signal, the effect dataword having at least two bits, the bits, as a group, representing an image processing operation;

(c) buffering the entire effect dataword in a first buffer;

(d) decoding the entire buffered effect dataword at a first decoder to determine what specific image process operation is to be executed upon the selected image signal by a first image processing module;

(e) processing the selected image signal in the first image processing module in accordance with the determination made in said step (d);

(f) buffering, in a second buffer, an entire effect dataword received from the first buffer;

(g) decoding the entire effect dataword buffered in the second buffer to determine what specific image process operation is to be executed upon the selected image signal received from the first image processing module by a second image processing module; and (h) processing the selected image signal received from the first image processing module in the second image processing module in accordance with the determination made in said step (g).

15. The apparatus as claimed in claim 1, wherein said first decoding means modifies a portion of the entire effect dataword prior to the entire effect dataword being received by said second buffer means.

* * * * *